US012614228B2

(12) United States Patent
Glass et al.

(10) Patent No.: US 12,614,228 B2
(45) Date of Patent: Apr. 28, 2026

(54) SYSTEMS AND METHODS FOR PROCESSING OF MULTI-ORDER MARKET TRANSACTIONS BASED ON VISIBLE AND RESERVE SIZES AND GENERATION OF ORDER IDENTIFIERS FOR THE SAME

(71) Applicant: BGC PARTNERS, L.P., New York, NY (US)

(72) Inventors: Nicholas Glass, Chatham, NJ (US); Bijoy Paul, Jersey City, NJ (US); Joseph E. Peters, Jr., New York, NY (US)

(73) Assignee: BGC PARTNERS, L.P., New York, NY (US)

( * ) Notice: Subject to any disclaimer, the term of this patent is extended or adjusted under 35 U.S.C. 154(b) by 0 days.

(21) Appl. No.: 18/153,019

(22) Filed: Jan. 11, 2023

(65) Prior Publication Data

US 2023/0222589 A1     Jul. 13, 2023

Related U.S. Application Data

(60) Provisional application No. 63/266,667, filed on Jan. 11, 2022.

(51) Int. Cl.
*G06Q 40/00* (2023.01)
*G06Q 40/04* (2012.01)

(52) U.S. Cl.
CPC .................................... *G06Q 40/04* (2013.01)

(58) Field of Classification Search
CPC .................................................... G06Q 40/04
See application file for complete search history.

(56) References Cited

U.S. PATENT DOCUMENTS

| | | | | |
|---|---|---|---|---|
| 10,304,097 | B2 * | 5/2019 | Daley | G06Q 40/04 |
| 2003/0055771 | A1 * | 3/2003 | RuDusky | G06Q 40/04 |
| | | | | 705/37 |
| 2003/0177086 | A1 * | 9/2003 | Gomber | G06Q 40/04 |
| | | | | 705/37 |
| 2005/0240510 | A1 * | 10/2005 | Schweickert | G07F 7/06 |
| | | | | 705/37 |

(Continued)

FOREIGN PATENT DOCUMENTS

| | | | | |
|---|---|---|---|---|
| WO | WO-2018128837 | A1 * | 7/2018 | G06Q 40/04 |

OTHER PUBLICATIONS

Zotikov et al: "CME Iceberg Order Detection and Prediction", Quantitative Finance, vol. 21, 2021—Issue 11 (Year: 2021).*

*Primary Examiner* — Edward J Baird

(57) ABSTRACT

Techniques are disclosed herein for iceberg order processing by an exchange system that includes storing a first representation of an iceberg order requested by a user in an order book and automatically causing a second representation to be stored for the iceberg order in the order book after the displayed quantity associated with the first representation is depleted/zeroed or otherwise below a predetermined threshold following execution of an associated trade. The second representation of an iceberg order can be referred to as a reclip order, and N number of such reclip orders can be stored/accepted in this manner by the exchange system until a hidden/reserve quantity (also referred to herein as a remaining iceberg quantity) is zero or the user who originated the iceberg order submits a cancel request.

16 Claims, 5 Drawing Sheets

(56)                  References Cited

U.S. PATENT DOCUMENTS

| | | | |
|---|---|---|---|
| 2007/0118460 A1 * | 5/2007 | Bauerschmidt | G06Q 40/08 |
| | | | 705/37 |
| 2007/0294162 A1 * | 12/2007 | Borkovec | G06Q 40/04 |
| | | | 705/37 |
| 2010/0145842 A1 * | 6/2010 | Rao | G06Q 30/0611 |
| | | | 705/37 |
| 2010/0145843 A1 * | 6/2010 | Janowski | G06Q 40/04 |
| | | | 705/37 |
| 2011/0307372 A1 * | 12/2011 | Schluetter | G06Q 40/00 |
| | | | 705/37 |
| 2015/0026033 A1 * | 1/2015 | Curran | G06F 16/24558 |
| | | | 705/37 |
| 2016/0162990 A1 * | 6/2016 | Hosman | G06Q 40/04 |
| | | | 705/37 |
| 2017/0004578 A1 * | 1/2017 | Cooper | G06Q 30/0633 |
| 2018/0191624 A1 * | 7/2018 | Haynold | H04L 43/0852 |
| 2019/0005582 A1 * | 1/2019 | Kapur | G06Q 40/06 |
| 2023/0033983 A1 * | 2/2023 | Prem | G06F 9/485 |

* cited by examiner

*100*

COMMON DATA
CHANNEL
106

CLOCK
CONTROLLER
108

ME INSTANCES
104

EXCHANGE
INSTANCE
102

128

EXCHANGE
LAYER
126

API GATEWAY
110

MARKET DATA
GATEWAY
112

INTERFACE
LAYER
124

118-2

118-3

114

116-1

118-1

116-2

USER
LAYER
122

*300*

401

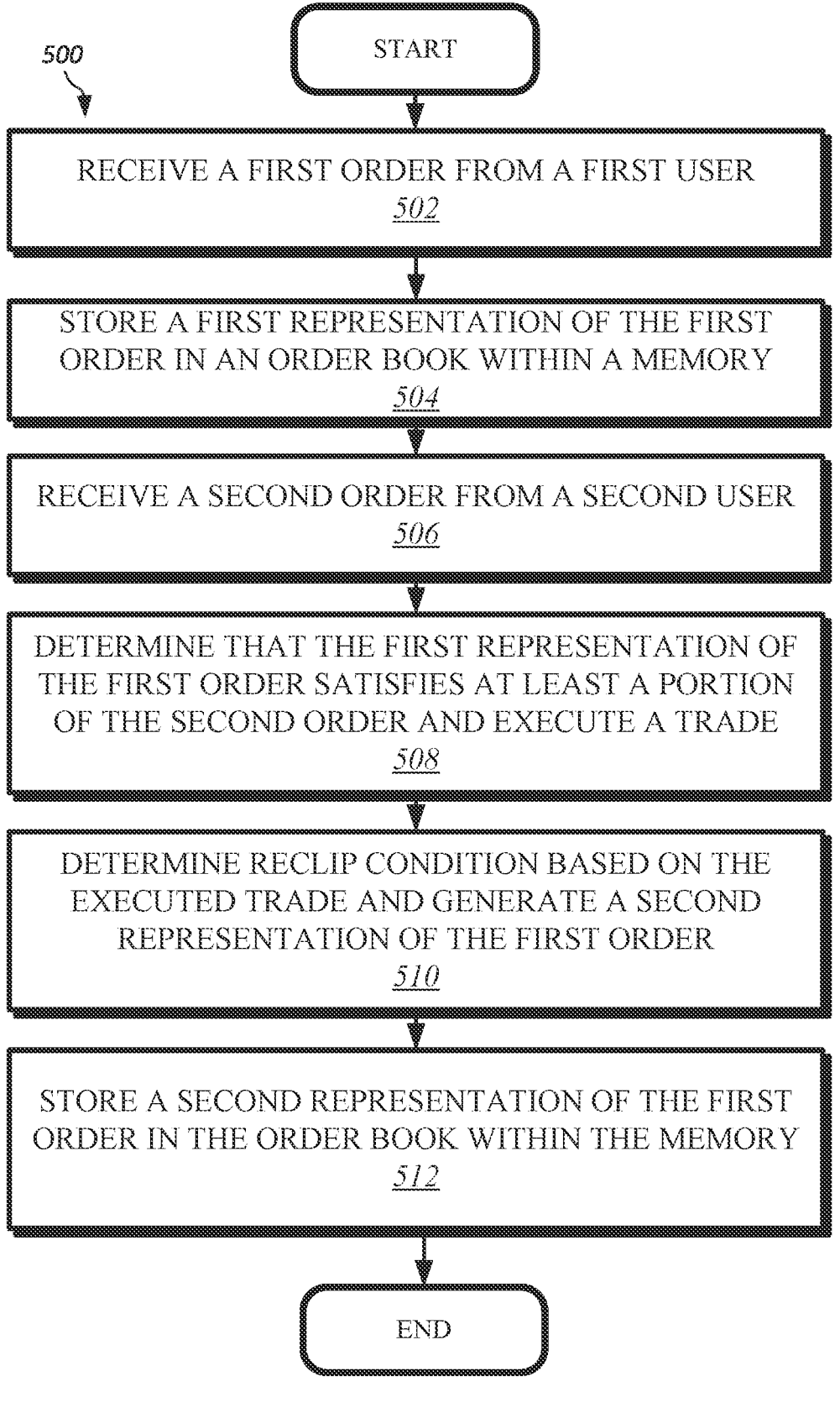

*500*

START

RECEIVE A FIRST ORDER FROM A FIRST USER
*502*

STORE A FIRST REPRESENTATION OF THE FIRST
ORDER IN AN ORDER BOOK WITHIN A MEMORY
*504*

RECEIVE A SECOND ORDER FROM A SECOND USER
*506*

DETERMINE THAT THE FIRST REPRESENTATION OF
THE FIRST ORDER SATISFIES AT LEAST A PORTION
OF THE SECOND ORDER AND EXECUTE A TRADE
*508*

DETERMINE RECLIP CONDITION BASED ON THE
EXECUTED TRADE AND GENERATE A SECOND
REPRESENTATION OF THE FIRST ORDER
*510*

STORE A SECOND REPRESENTATION OF THE FIRST
ORDER IN THE ORDER BOOK WITHIN THE MEMORY
*512*

END

FIG. 5

SYSTEMS AND METHODS FOR PROCESSING OF MULTI-ORDER MARKET TRANSACTIONS BASED ON VISIBLE AND RESERVE SIZES AND GENERATION OF ORDER IDENTIFIERS FOR THE SAME

CROSS REFERENCE TO RELATED APPLICATIONS

This application claims the benefit of U.S. Provisional Application No. 63/266,667 filed Jan. 11, 2022, which is incorporated by reference herein in its entirety.

TECHNICAL FIELD

This specification relates generally to electronic trading systems, and more particularly, to systems and methods for initiating multi-order transactions based on a hidden/reserve quantity and visible amount provided by a user/participant.

BACKGROUND INFORMATION

Computer-implemented exchange systems (also referred to as simply exchange systems) enable the trading of assets and have continued to evolve to accommodate the ever-growing number of global exchanges and volume of daily trades. Traditional asset types such as financial instruments can be traded by modern computer exchange systems at a volume and speed which was unimaginable a few short decades ago. Current United States financial regulations define financial instruments as those assets representing government issued currency, or a contract establishing a right or obligation to deliver or receive value in the form of government issued currency or another financial instrument. Some example financial instruments include securities, stocks, option contracts, future contracts, and options on future contracts, among many others. However, virtually any asset that holds capital/value can be represented digitally for trading by a computer-implemented exchange, which has now led to many new markets including the trading of non-fungible tokens (NFTs) and cryptocurrencies via globally-accessible computer-implemented exchanges.

Regardless of the particular type(s) of assets tradeable on a computer-implemented exchange system, one common approach is to implement an order book for each type of financial instrument which is tradeable by the system. Each order book can be used to store a real-time list of outstanding orders in memory for the associated asset and represents the interests of buyers and sellers. Order books can be visualized by a user interface provided by an exchange system, for example, to allow the user to better understand current market conditions. The user interface can also allow for a user to execute one or more trade actions such as submitting new orders to buy or sell an asset, modifying previously-submitted orders, and canceling orders. In some cases, an exchange system can provide an application programming interface (API) to enable a computer algorithm to access an order book and execute any aforementioned order action on behalf of a user including querying the order book and receiving real-time order and/or trade updates.

Exchange systems are often required to process vast amounts of order actions by users/API and store trading data associated with execution of trades to satisfy an order. This can include receiving and executing hundreds to thousands of order actions and related trades per second, for example. Exchange systems can include a process for managing order books for a given asset type including submission of new orders (e.g., on the buy or sell side), updating existing orders within an order book, and cancellation of orders and removal from an order book. Execution of trades in connection with an order book can include an algorithm/process for matching submitted orders to contra-side order(s) in the order book. After trade execution, an exchange system can store a representation of each executed trade as trading data stored within a database. In addition, the exchange system can output the trading data via market data updates which can be consumed/utilized by users via a network connection, for example.

BRIEF DESCRIPTION OF THE DRAWINGS

These and other features and advantages will be better understood by reading the following detailed description, taken together with the drawings wherein:

FIG. 5 shows an example iceberg order process consistent with aspects of the present disclosure.

The drawings included herewith are for illustrating various examples of articles, methods, and apparatuses of the teaching of the present specification and are not intended to limit the scope of what is taught in any way. Like reference numerals indicate like components throughout the figures.

DETAILED DESCRIPTION

Figure 1:
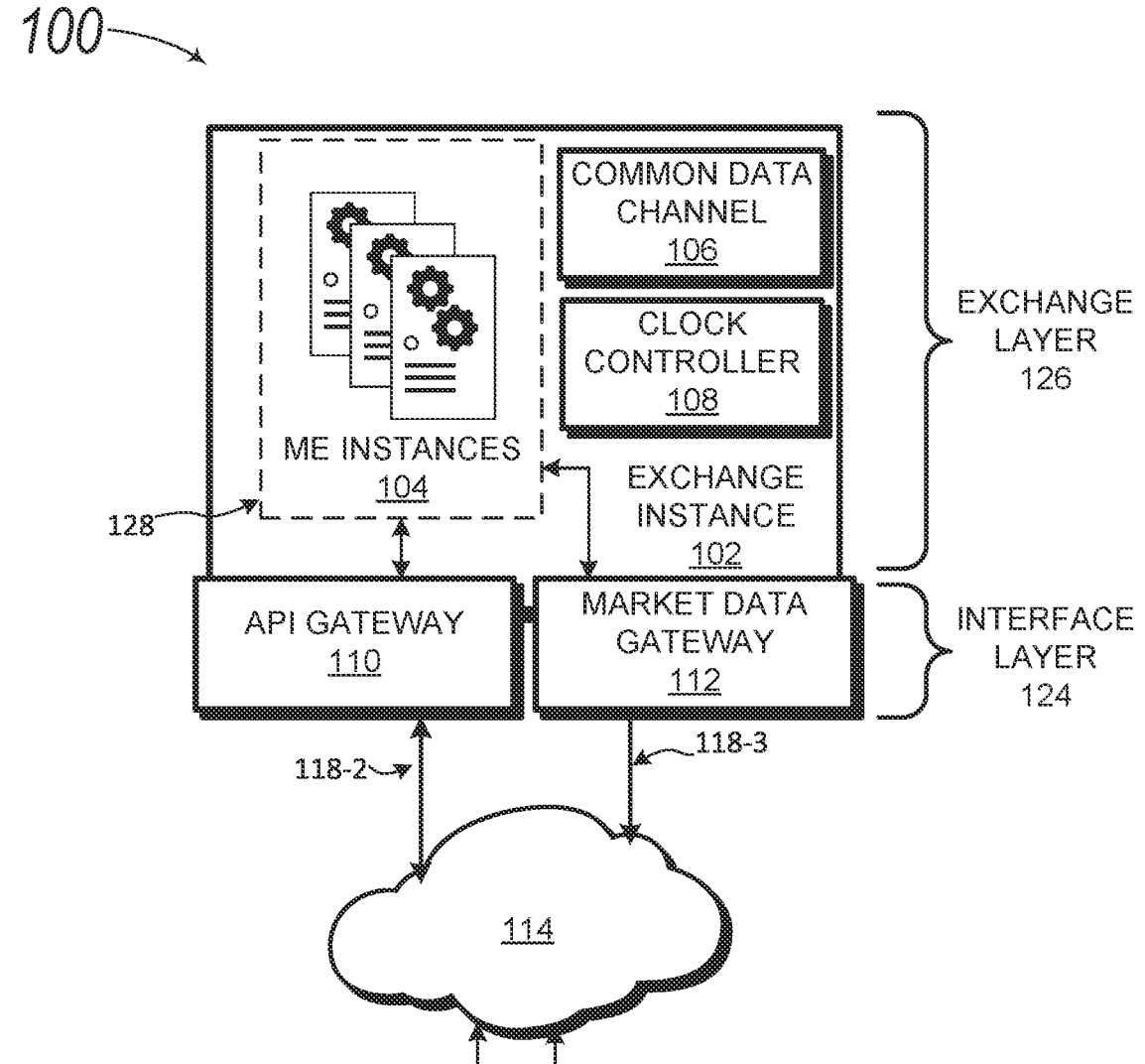
FIG. 1 shows a block diagram of an example exchange system consistent with aspects of the present disclosure.

As discussed above, the management of order books within an exchange system can include a process for order workflows such as submitting new orders into an order book, updating orders within the order book, cancellation of orders within an order book, and for matching orders with contra-side order(s) for purposes of trade execution. This process may also be referred to as a matching engine (ME) instance or simply a matching engine. To allow users to communicate with the ME instances, e.g., to submit order-related requests via a data network, the exchange system can implement an application programming interface (API).

Users of the exchange system may then submit new orders via the API and confirm an order was accepted by a ME instance based on receiving an acknowledgement message such as an order confirmed message. The order confirmed message can include an identifier for the accepted order to allow the user to track the status of the order and/or perform actions such as modifying or canceling the order via a trade modification request. The identifier of the order may also be referred to herein as an exchange order identifier. A market data gateway of the exchange system can output a market data update message, e.g., via a user datagram protocol (UDP) or other packet type, to users of the exchange system to reflect the accepted order as well as other events such as trade executions. In one example, the market data update message can include various characteristics for the accepted order, e.g., asset type, target price, and/or quantity as well as the exchange order identifier for the accepted order. A user may then determine the stack position for a submitted/accepted order relative to other orders within a corresponding order book of an ME instance based on, for instance, identifying an entry within the market data update message that includes the exchange order identifier provided within the aforementioned order confirmed message. Users of the exchange system can subscribe to all or a subset of market data updates such as on a per-instrument basis via one or more rules/filters, and track the relative positions of orders, including their own, in the exchange system based on the subscribed market data updates.

This "1-order in, market data out" approach is suitable for scenarios where users seek to fill relatively standard orders, which is to say orders with quantities which are unlikely to cause a market shift. For instance, consider a scenario where a first asset type within the exchange system has an average order quantity in a range of 100 to 1000 units. If an order is submitted for the first asset type with a quantity that is one or more magnitudes greater than the average order quantity, this order is likely to cause a market shift. This market shift may prevent the full quantity from being traded at a target price as the market price and demand may swing rapidly in response to the order, as the case may be.

Accordingly, users who seek to trade a relatively large quantity of an asset tend to break up the trade into a sequence of orders, with each order having a target quantity that is only a portion/fraction of the total target quantity. This sequencing of orders is generally referred to as an iceberg order based on each order in the sequence only having a "visible" or "displayed" portion of the overall quantity. For instance, a user who seeks to trade a total quantity of one-hundred million of a first asset at target price X can submit ten single orders that each include a target quantity of ten-million. To avoid the potential for market shift as discussed above, the user may only have a single order of the sequence pending in an order book at a time. When the user receives a trade confirmed message from, for instance, a ME instance of the exchange system that indicates the entire quantity of the pending order has been utilized to satisfy one or more trades, the user may then submit a new order with the target quantity of ten-million and the target price X or other desired price until the entire target quantity of the first asset has been traded. However, this manual iceberg order process results in a network latency in a range of tens to hundreds of milliseconds, at best, between when a trade confirmed message is output to, and received by, the user and the user responds with a request to submit a new order for the next "chunk" of the iceberg order. In an exchange system that assigns a stack position in an order book based on the time an order request is received, this latency can result in the newly submitted order for an iceberg having a relatively low/unfavorable stack position in the order book relative to the stack position of the previous order for the iceberg.

There exists a need for an exchange system that allows a user to initiate an iceberg order, e.g., via an API request, in a manner that ensures that when a current/pending order for an iceberg is utilized to satisfy an executed trade and the resulting quantity remaining for the pending order is zero or otherwise below a predetermined threshold, a new order is automatically submitted to the order book for the iceberg order at a latency of the exchange system (also referred to herein as an exchange system latency) rather than at a latency introduced by network/API messaging. Such orders that get automatically submitted to the order book for an iceberg trade can be referred to as reclip orders. The term automatically in the context of reclip orders refers to the submission of the same into a corresponding order book by a ME instance when a reclip condition is detected, e.g., when a pending order for an iceberg has an available quantity of zero following an executed trade, without the necessity of receiving user input beyond the initial/original request to submit the iceberg order. Likewise, there exists a need for an exchange system that can implement iceberg order processing within each ME instance that results in market data update messages being output to users which hide or otherwise obscure the presence of the iceberg orders to avoid market swings/shifts while comporting with regulatory reporting requirements.

Thus, in accordance with an aspect of the present disclosure, techniques are disclosed for iceberg order processing by an exchange system that includes storing a first representation of an iceberg order requested by a user in an order book and automatically causing a second representation to be stored for the iceberg order in the order book after the displayed quantity associated with the first representation is depleted/zero after execution of a trade. This second representation can be referred to as a reclip order, and N number of such reclip orders can be stored/accepted in this manner until a hidden/reserve quantity (also referred to herein as a remaining iceberg quantity) is zero or the user who originated the iceberg order submits a cancel request. Note, reclip orders may also be stored/accepted when, for instance, the available quantity of a pending representation of the iceberg order is below a predetermined threshold. Each representation of the iceberg order including the first representation preferably includes a different exchange order identifier, and preferably, a unique exchange order identifier. The user who originated the iceberg order may then receive trade confirmed messages which can be used by the user to associate the iceberg order with each reclip order stored/accepted in the order book based on the generated exchange identifiers. Market data update messages may then be output by the exchange system to users/participants that reflects each trade executed in connection with the iceberg order as well as the storing/acceptance of reclip orders in an order book in a manner that obscures/conceals the presence of the iceberg order based the market data update messages including the new/different exchange order identifiers for reclip orders rather than a single/common exchange order identifier for the iceberg order.

In more detail, an exchange system consistent with a present disclosure can implement a distributed transaction architecture via a plurality of ME instances, with each ME instance managing an order book for an assigned asset type and performing matching routines and trade executions based on the order book. Each ME instance can store representations of orders in the order book for matching and trade execution purposes. Each ME instance can initiate an iceberg order process consistent with the present disclosure based on receiving a user request to submit an iceberg order, e.g., via a data network. The user request can be configured to cause the receiving ME instance to store/accept an initial order for the iceberg order in an order book, with the initial order offering a portion of a hidden/reserve quantity of an asset based on a visible amount value included in the user request. This portion of the hidden/reserve quantity of an iceberg order can be referred to as a current displayed quantity or simply a displayed quantity. A hidden/reserved quantity defined by the user request is preferably private and internal to the ME instance, e.g., the hidden/reserve quantity is not published to users of the exchange system via market data update messages. The ME instance may then automatically store/accept new standing orders for an iceberg order within the order book after a current pending/standing order for the iceberg order is fully aggressed/utilized to satisfy an executed trade, e.g., the executed trade results in a corresponding displayed quantity to be equal to zero. In scenarios where a current pending/standing order for the iceberg order is partially utilized, e.g., less than the entire displayed quantity is utilized to satisfy an executed trade, the displayed quantity can be updated to reflect the quantity that remains after the executed trade. The term "automatically" in this context refers to storing/accepting new orders in the order book for the iceberg order by a ME instance without the necessity of receiving further user input beyond the initial user request that initiated the iceberg order.

A ME instance can determine that a representation of an order in an order book is associated with an iceberg order based on, for example, the representation including a visible amount value which is greater than zero. Conversely, the ME instance can determine if a representation of an order stored in the order book is for a non-iceberg order, e.g., a standard order, based on the visible amount value included in the representation being equal to zero. Note, this disclosure is not necessarily limited in this regard and other values stored in a representation of an order can be utilized by an ME instance to identify iceberg orders, or non-iceberg orders, as the case may be. In one example, the structure/format of the representations for both iceberg and non-iceberg orders stored within the order book in memory by a ME instance can be identical. The representations for standard/non-iceberg orders can therefore include an identical overall size or schema/layout to that of iceberg orders, with those values pertaining to iceberg properties such as visible amount being zeroed out or otherwise set to a NULL value. This advantageously allows for efficient memory operations and traversal (e.g., during a matching process of an ME instance during operation) based on, for instance, pre-allocation of memory for new orders that is order-type agnostic and/or instantiating and storing memory-aligned data structures to represent orders within the order book. Some such example formats for representations of orders stored in an order book can be binary and/or in a human-readable format such as JavaScript Object Notation (JSON).

A ME instance preferably generates a new exchange order identifier for each representation of an iceberg order stored in an order book. This can include generating an initial or first exchange order identifier for the first representation of the iceberg order, followed by a second exchange order identifier for the second representation, a third exchange order identifier for a third representation, and so on. Each exchange order identifier generated for a reclip order of the iceberg order is preferably unique/different. The ME instance can store the first representation of the iceberg order at a position in the order book based on a priority scheme implemented by the exchange system, such as price-time priority. Each subsequent representation of the iceberg order stored in the order book by the ME instance, such as the second and third representation of the iceberg order, can be stored by a ME instance at the same/identical position in the order book as the first representation of the iceberg order rather than at a position that would otherwise be determined by the implemented priority scheme of the exchange system. Note, in some cases representations for reclip orders may not necessarily be stored at a position in an order book that is identical to the previous representation for the iceberg order. For example, in a scenario that includes two or more different iceberg orders being utilized to satisfy an executed trade, each representation of a reclip order for the two or more different iceberg orders may not necessarily be stored in a position within the order book that is identical to the position of the previous representation, as will be discussed in greater detail below. In any event, the representation of reclip orders for an iceberg order are preferably stored in a position in the order book that ensures priority over those non-iceberg orders that were stored/accepted after the request that initiated the iceberg order.

Market data message(s) output by the exchange system in connection with the storing/acceptance of each representation of the iceberg order preferably include the corresponding generated exchange order identifiers. Likewise, market data update messages output by the exchange system that indicate trade executions in connection with the iceberg order preferably include only the corresponding generated exchange order identifiers. Thus, the market data update message(s) output by the exchange system following execution of a trade in connection with the iceberg order and the storing/acceptance of a reclip order for the iceberg can prevent or otherwise obscure users from identifying the presence of the iceberg order by generating new/reclip exchange order identifiers for each reclip order for the iceberg order. Conversely, the ME instance can provide a trade confirmed message to the user that initiated the iceberg order to provide an indication of the executed trade and the storing/acceptance of the new/reclip order as well as the newly generated exchange order identifier corresponding to the same. Notably, this trade confirmed message can provide the newly generated exchange order identifier for the reclip order along with an identifier of the iceberg order such as the first/initial exchange order identifier and/or a user-defined identifier such as alias. The user may then track the status of their iceberg order including the executed trade(s) and a currently pending order for the iceberg order within the order book based on trade confirmed messages and/or corresponding market data updates using the associated exchange order identifiers.

An exchange system consistent with the present disclosure may therefore achieve various technical features and advantages over existing exchange systems. For example, an exchange system consistent with the present disclosure can cause reclip/new orders to be automatically submitted for iceberg orders at a latency that is equal to the exchange latency rather than at a network-dependent (e.g., round-trip) latency and at a stack position for new/reclip orders within an order book which is prioritized over new orders submitted via the API. Preferably, execution of trades by the exchange system, and more specifically a ME instance of the exchange system, and the storing/acceptance of the reclip/new order in the order book occurs within an atomic transaction, as discussed in further detail below. In addition, a ME instance implementing an iceberg order process consistent with the present disclosure can maintain an originating exchange order identifier for an iceberg order as well as generate new exchange order identifiers for reclip/new orders for the iceberg order. Notably, the originating exchange order identifier and the new exchange order identifier for the reclip order can be stored within the order book in a format/layout which is similar or identical to representations of non-iceberg/standard orders, e.g., for efficient memory allocation and traversal by a ME instance as discussed above.

Further, trade executions and reclip orders for an iceberg order process consistent with the present disclosure may then result in the exchange system outputting market data updates that can prevent or otherwise obscure the presence of the iceberg order by utilizing the newly generated exchange order identifiers rather than a single, repeated exchange order identifier for an iceberg order, e.g., an originating/initial exchange order identifier for the iceberg order. In one example, a ME instance only stores in memory two exchange order identifiers for each iceberg order (e.g., the originating exchange order identifier, and the current exchange order identifier) at any given moment in time rather than each and every exchange order identifier generated for an iceberg order. More preferably, the ME instance only stores the two exchange order identifiers for an iceberg order in a current representation of the iceberg order stored in the order book rather than in a dedicated/isolated memory area within the ME instance. Therefore, the ME instance can perform normal matching routines by querying/traversing order representations within the order book in memory, and advantageously have both standard/normal order characteristics (e.g., target price, current available quantity) as well as iceberg order characteristics available via a single representation of each order. Thus, a ME instance can both advantageously limit the overall memory footprint to maintain/track an iceberg order through its lifespan as well as limit processor/controller usage by retrieving/accessing order representations during a matching process and determining if an order is an iceberg order as well as the characteristics to utilize store/accept a reclip order within the order book based on the values stored within a corresponding representation without necessarily performing an additional step, e.g., a lookup/query in a database in memory that associates iceberg orders with characteristics such as originating exchange order identifier, current exchange order identifier, hidden amount and remaining iceberg quantity.

Turning to the figures, FIG. 1 shows an example exchange system 100 consistent with aspects of the present disclosure. The exchange system 100 may also be referred to herein as a system for processing of electronic trades, a distributed exchange system or simply an exchange system. The exchange system 100 can be configured to allow for trading of a plurality of different asset types such as treasury benchmarks with varying maturity dates and yields, stocks, debt instruments, and crypto currencies, just to name a few.

In the example of FIG. 1, the exchange system 100 includes a plurality of layers including a user layer 122, an interface layer 124, and an exchange layer 126.

The user layer 122 can include one or more computer devices such as a first computer device 116-1 and a second computer device 116-2. The one or more computer devices can be implemented as workstation computers, server computers and/or mobile computers (e.g., smart phones, laptops, tablets, smart watches).

The one or more computer devices within the user layer 122 are preferably implemented with a network interface circuit (NIC) to communicate with a wide area network 114. The wide area network 114 can be implemented as, for example, the Internet. In the example of FIG. 1, the first and second computer devices 116-1, 116-2 respectively transmit and receive signals 118-1 from the wide area network 114 via a protocol that preferably conforms with a standard protocol such as an Institute of Electrical and Electronics Engineers (IEEE) 802.X standard. In one example, the signals 118-1 are data packets that comport with the Transmit Control Protocol (TCP).

Preferably, the one or more computer devices within the user layer 122 are configured to execute programs or "apps" that enable communication with the interface layer 124, which is discussed in further detail below.

The interface layer 124 preferably includes an application programming interface (API) gateway 110 and a market data gateway 112. The API gateway 110 and the market data gateway 112 can be implemented via hardware, software, or a combination thereof. The API gateway 110 can be implemented as a representational state transfer (REST) API gateway, although other API gateway types may be utilized such as Simple Object Access Protocol (SOAP), Remote Procedure Call (RPC), Financial Information eXchange (FIX) and proprietary binary messaging (BIN).

The API gateway 110 can be configured to receive signals 118-2 via the wide area network 114. The signals 118-2 can be the same or different from the signals 118-1. In one example, the signals 118-1 and 118-2 are implemented as TCP packets. The API gateway 110 can be configured to receive user requests from the user layer 122, e.g., from computer device 116-1 via the signals 118-2. The user requests can include new order submission requests, order change/modification requests, order cancellation request, order execution request, and order status requests, for example. The user requests can include a request to initiate an iceberg order as discussed further below. The API gateway 110 can be configured to process/satisfy user requests by communicating with one or more ME instances.

Preferably, each ME instance of the plurality of ME instances 104 is configured to generate an identifier for each new order stored/accepted into an associated order book, and by extension accepted into the exchange system 100. The identifier generated for each order may also be referred to herein as an exchange order identifier. The generated identifier can be output by the exchange system 100 to the user that originated the new order request within an acknowledgement message, such as an order confirmed message, for example. The order confirmed message may also be referred to herein as an order accepted message. The generated identifier for each new order is preferably a value that uniquely represents the accepted order across the plurality of ME instances 104. More preferably, the generated identifier for each new order is unique system-wide/globally within the exchange system 100. In this example, other components of the exchange system 100 such as the market data gateway 112 can output market data updates utilizing the identifier generated by a ME instance without necessarily generating a new/additional identifier.

In one example, the identifier for each order can have an overall size in a range of four to sixty-four bytes depending on a desired configuration. Preferably, the identifier for each order is a numeric value although this disclosure is not limited in this regard. As will be discussed in greater detail below, the identifier generated by the exchange system for each order, and more specifically by an ME instance of the exchange system, can include a format scheme that allows for N number of bits for the encoding of one or more values, and/or N number of bits for encoding a randomization/sequence value to ensure that each ME instance generates unique exchange order identifiers for a predetermined period of time without the potential for a rollover/conflict. The predetermined period of time can be, for instance, one trading day (e.g., 24 hours). Accordingly, and in the immediate example of the predetermined period of time being 24 hours, identifiers for new orders may be re-used/recycled at a start of the next trading day by ME instances. When the identifier generated by a ME instance is output as a market data update via the market data gateway, the identifier may also be referred to herein as a market order identifier. Additional example features and aspects of generating order identifiers consistent with the present disclosure as discussed further below with reference to FIG. 3.

Alternatively, or in addition, each exchange order identifier can be generated based on a pool of available identifiers. The pool of available identifiers can be finite and can be pre-allocated based on a target size. For example, the pool of available identifiers can be implemented as a vector stored in the memory of each ME instance of the plurality of ME instances 104. Each of the available identifiers stored in the vector of each ME instance can be generated in a predetermined format as discussed below with reference to FIG. 3. Each ME instance may then "pop", remove, or otherwise acquire an identifier from the pool of available identifiers prior to a ME instance storing a representation of a new order within an order book in memory.

Preferably, all order-related user requests received via the API gateway 110 such as the new order submission requests, order change/modification requests, and order cancellation requests are reflected via market data updates output to users/consumers of the exchange system 100 by the market data gateway 112. In the example of FIG. 1, this can include the market data gateway 112 outputting market data updates to, for example, the user of the second computer device 116-2 via signals 118-3. The market data gateway 112 can be configured to output market data updates in a standard format, e.g., JavaScript Object Notation (JSON), FIX, and/or BIN. Such market data updates can be output in a message/packet which can include, for example, a plurality of entries. The market data updates may also be referred to herein as market data update messages. Each entry within a market data update message can include an exchange order identifier for one or more orders associated with an event, an event value (e.g., a value that represents an order event such as add, modify, trade, cancel), a timestamp value, a target/executed price, a target/executed quantity, or any combination thereof. The market data gateway 112 can output market data messages via signals 118-3 to a network such as the WAN 114.

As shown in the example of FIG. 1, the exchange layer 126 includes an exchange instance 102. The exchange instance 102 preferably includes a plurality of components for order management workflows including, for example, new order creation, order update/modifications, matching of orders, and publishing/output of pricing data (e.g., current bid/ask pricing). The plurality of components can be implemented via hardware, software, or a combination thereof. The plurality of components can be implemented via a single computer server or via a plurality of computer servers which communicate with each other via a network (not shown).

In the example of FIG. 1, the exchange instance 102 includes a plurality of ME instances 104, a common data channel 106, and a clock controller 108. The plurality of ME instances 104 can be implemented via a same or different controllers/processors. One such example controller 201 is discussed further below with reference to FIG. 2. In one preferred example, each ME instance of the plurality of ME instances 104 is implemented on a different processor/thread such that each ME instance has dedicated processor resources. Each ME instance can be implemented via the same plurality of machine-readable instructions stored in a memory, e.g., the same program code/instructions, as the other ME instances. This allows each ME instance to manage order workflows and an order book for potentially any of the asset types, e.g., based on a local provisioning/configuration file.

In addition, updates for purposes of bug fixes, security patches and/or feature upgrades can be deployed to the ME instances in a unified manner. Of course, ME instances may have different operating code/programs relative to other ME instances, or a different version of common operating code/programs for the ME instances depending on a desired configuration.

Each ME instance is preferably configured to store an ME instance identifier, which may also be referred to herein as an instance identifier or member instance identifier, in a memory such as memory 203. The ME instance identifier for each ME instance is preferably unique within the exchange system 100. The ME instance identifier can be used to generate exchange order identifiers which are unique across the plurality of ME instances 104, as will be discussed in further detail below.

The controller 201 can be at least one processor such as an x86 instruction set processor or any other suitable controller such as a field programmable gate array or application-specific integrated circuit (ASIC). In one example, a controller, e.g., controller 201 of FIG. 2, can execute a ME instance based on instructions stored in a memory, e.g., memory 203 of FIG. 2, and provision the executed ME instance based on, for instance a provisioning/configuration file as discussed above. Such provisioning can include, for example, establishing which asset type the executed ME instance will process orders for based on an asset type identifier, and the assigned identifier for the executed ME instance based on an assigned ME identifier. The memory 203 can further include an order book 207 for storing representations of orders that can be matched and executed during operation of the exchange system 100. The memory region for storing the order book 207 is preferably volatile memory such as DDR4 memory. The memory can further include a database 205. The database 205 can be a flat file or a relational database. The database 205 can include rule sets that can be utilized by a matching engine instance to, for example, identify positions for new orders within the order book 207 and/or for generation of exchange order identifiers consistent with the present disclosure.

Returning to FIG. 1, the common data channel 106 can be configured to allow for the plurality of ME instances 104 to communicate with each other. In one example, the common data channel 106 is an Ethernet network or other suitable communication network.

The clock controller 108 can be implemented as hardware and/or software and can be utilized by the plurality of ME instances 104 as a common clock for synchronization purposes. Preferably, the plurality of ME instances 104 can use an output signal from the clock controller 108 to maintain time synchronization between ME instances in a range of about 1 to 25 microseconds. The clock controller 108 may also be configured to output a signal that provides a monotonically increasing value, as discussed above. The clock controller 108 may also be referred to herein as a common clock controller or a shared clock controller. In one example, the plurality of ME instances 104 utilize the monotonically increasing value that is output by the clock controller 108 for purposes of generating exchange order identifiers that are unique across the plurality of ME instances, as is discussed in further detail below.

In operation, a ME instance of the plurality of ME instances 104 can receive a request to submit a first order from a first user, such as from the user of the first computer device 116-1 via signals 118-1 and 118-2 communicated via the wide area network 114 (FIG. 1). The request can be provided as, for example, an Ethernet packet or other suitable protocol/standard. The request to submit the first order can include, for example, an identifier of an asset type, a target price, a total hidden/reserve quantity, and a visible amount. In one example, the API gateway 110 can determine which ME instance receives the request to submit the first order based on a table in memory that associates the identifier of the asset type defined within the request to submit the first order with an associated ME instance that maintains an order book for the asset type. In this example, the receiving ME instance can determine the request to submit the first order is for an iceberg order based on the visible amount being greater than zero. A request for an order, such as the aforementioned request for the first order, that includes a non-zero visible amount may also be referred to herein as a request for an iceberg order. Conversely, a non-iceberg order can include the request to submit the order having a visible amount set to zero or other NULL value.

The receiving ME instance may then generate an exchange order identifier for the first order requested by the first user based on the request to submit the first order received by the ME instance. The ME instance may generate the exchange order identifier based on rules stored in a memory, such as based on rules stored within the database 205 of the memory 203 (See FIG. 2). In one example, such rules can include generating the exchange order identifier with a predetermined total number of bytes, such as 8, 16, 32, 64, 128, 256 or 512 bytes. The rules can further define one or more values to encode within the predetermined number of bytes, and alignment/position properties for each encoded value such as the number of bytes/bits to utilize and an offset value. This can include, for instance, encoding the identifier of the matching engine instance into a predetermined number of bytes beginning from a target offset, such as zero, using bitwise operations such as AND, ORs and XORs.

Figure 3:
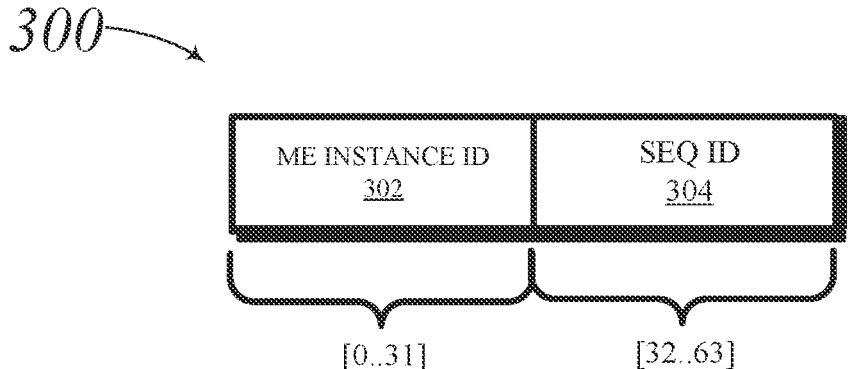
FIG. 3 shows an example encoding scheme for an exchange order identifier consistent with aspects of the present disclosure.

For example, and as shown in FIG. 3, an exchange order identifier 300 can include sixty-four (64) total bits, or eight (8) total bytes. Within the sixty-four bits, a first set of contiguous bits [0 . . . 31] representing a first thirty-two (32) bit value can be encoded with the identifier of the matching engine instance 302 that received the request to submit the order. A second set of contiguous bits [32 . . . 63] representing a second thirty-two bit value may then be encoded with a sequence identifier (SEQ ID) 304. The sequence identifier 304 can be based on, for example, the monotonically increasing value output by the clock controller 108. At the start of each new trading day, the clock controller 108 may reset and begin outputting the monotonically increasing value from a starting value of zero, for example. Each 'tick'/increment of the monotonically increasing value output by the clock controller 108 can occur at a predetermined frequency in a range of 75 to 250 nanoseconds, less than or equal to 100 nanoseconds, for example. Thus, in the example of a frequency of 100 nanoseconds, at time zero (T0) the value output by the clock controller 108 can be zero (0), at T0+100 nano seconds the value output by the clock controller 108 can be one (1), at T0+200 nano seconds the value output by the clock controller 108 can be two (2), and so on. The monotonically increasing value output by the clock controller 108 can continue to increment/change at a rate governed by the predetermined frequency. Note, in one example each exchange order identifier may be generated with a sequence value that is simply a previous sequence value plus one (new sequence=previous sequence value+1). Each ME instance can generate sequence values in this manner, or may query an external device, such as the clock controller 108 or other suitable component to request a new/next sequence number.

The plurality of ME instances 104 may then utilize the clock controller 108 as a common clock source when generating exchange order identifiers consistent with the present disclosure. Note, the exchange order identifiers for both iceberg and non-iceberg orders can be generated by ME instances in the same/identical manner, which is to say ME instances can generate exchange order identifiers which are order-type agnostic. However, this disclosure is not limited in this regard and exchange order identifiers can encode a flag/value that indicates if the associated order is an iceberg order, or not, as the case may be. This may be achieved with as little as a single bit being a zero or a one at a predetermined location/offset in the exchange order identifier. In any event, the combination of the ME instance identifier 302 and the sequence identifier 304 encoded within the exchange order identifier 300 of FIG. 3, which form a tuple, may then be aggregated and utilized as a single value/unit to guarantee that each exchange order identifier generated by the plurality of ME instances 104 (see FIG. 1) is unique across the exchange system 100 for at least a predetermined period, such as 24 hours. Note, exchange order identifiers can include fewer or more bytes depending on a desired configuration and this disclosure is not necessarily limited to the example shown in FIG. 3. Likewise, the overall size for each generated exchange order identifier (e.g., in bytes), the particular alignment/order of the encoded values, the particular number of bits used to encode each value, and the particular values to encode when generating exchange order identifiers consistent with the present disclosure is not necessarily limited to the example shown in FIG. 3 and other schemes may be implemented with minor modification, e.g., based on rules within the database 205 (see FIG. 3).

Figure 2:
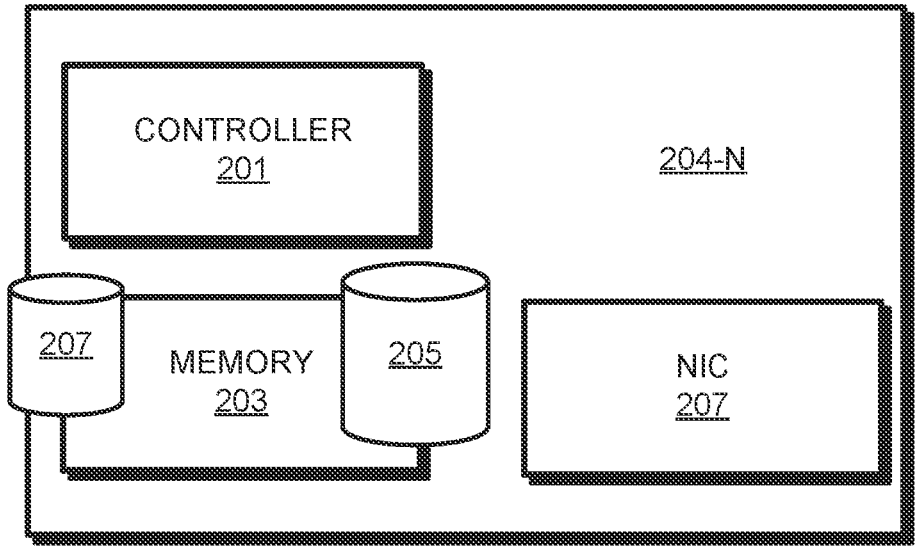
FIG. 2 shows a block diagram of an example matching engine instance suitable for use in the exchange system of FIG. 1.

Continuing, the ME instance which received the request to initiate the first order from the first user may then utilize rules stored in a memory, e.g., memory 203, to determine a position to insert/add a first representation of the new order into an order book, such as the order book 207 (see FIG. 2). In one example, the rules within the database 205 of FIG. 2 can be used to determine a position to store the first representation of the new order within the order book. Such rules may therefore be used to implement a default priority scheme for new orders within the exchange system. In this example, one such rule can provide logic that causes representations of orders to be stored in a price-time order in an order book, whereby the representations of orders are stored first within a particular price tier of the order book, then at a last position within the tier that results in any previously stored order representations having a relatively higher order to ensure they are matched prior to the later-received orders within a given price tier. The current position of each representation of an order in the order book within a given price tier can also be referred to herein as a stack position or a tier position. Of course, the current position of each representation can change based on events such as orders with a relatively higher stack position being used to execute trades. Accordingly, the term stack position or tier position as used herein does not necessarily refer to a fixed/static position or index in an order book but instead refers to a position in the order book relative to other orders at any given moment in time. For instance, consider a first order received at time X, a second order at time X+1 and a third order at time X+2. The position of the second order, assuming a price-time priority scheme, should remain at a higher stack position relative to the third order even after execution of the first order and removal from the order book by an ME instance such that the third order is matched and utilized by a ME instance to execute a trade only after the entire quantity of the second order is aggressed. Accordingly, when the present disclosure refers to each new order for an iceberg being stored/accepted at an identical stack position to that of a previous pending order for the iceberg order, this does not necessarily refer to a static index/position in an order book but rather a logical position relative to other orders in the same order book based on the particular order prioritization scheme implemented by the exchange system.

Note, and as discussed above, representations of reclip orders for an iceberg order may not be necessarily stored in a position in an order book that is identical to previous representation of the iceberg order. In an example where there are two or more iceberg orders present in an order book of a ME instance, there can be a partial reordering that includes the most recently traded reclips being reordered to the end of the price tier. Consider the following iceberg orders identified as A, B and C along with their respective displayed and remaining iceberg quantities of a first asset type: A 10/90; B 10/90; and C 10/90. Further consider that the representations of the iceberg orders A, B and C are stored in an order book in this provided order such that the location of the representation for iceberg order A is higher than the representation of the iceberg order B, and the representation of the iceberg order B is at a location in the order book that is higher than the representation of the iceberg order C. Now consider a contra-side order is received for 45 units of the first asset type. This can result in the following sequence of trades: i) iceberg order A for 10 units of the first asset type, ii) iceberg order B for 10 units of the first asset type, iii) iceberg order C for 10 units of the first asset type; iv) iceberg order A for 10 units of the first asset type; and v) iceberg order B for 5 units of the first asset type. In this scenario, each representation of reclip orders that follow a trade for the entire displayed quantity can be stored in a priority scheme that results in the most-recently traded iceberg being stored at a last/lower position relative to the other iceberg orders. In addition, a representation of a reclip order that follows only a portion of the displayed quantity being traded can result in that representation being stored at a relatively higher position in the order book relative to the representations for the iceberg orders which had their entire displayed quantity utilized by a trade. Accordingly, the resulting positions of respective representations for reclip orders following execution of the example trade discussed above can be iceberg order B (5/80); iceberg order C (10/80); and iceberg order A (10/70). Notably, this ordering still preferably results in each of the representations of the reclips for the iceberg orders A, B and C being stored in a position within the order book that is relatively higher than non-iceberg orders received after the iceberg orders were initiated/originated.

As discussed above, a current position of a representation of an order within the order book in memory can change, e.g., based on orders at a relatively higher position being matched and executed, order(s) being canceled by request, and so on. In addition, certain requested modifications to an order can cause the current position of a representation of the order to be changed. For example, a request by the user who originated an order to increase the offered/target quantity can result in the representation of the order being moved to the bottom/last position in the corresponding price tier and the target quantity being updated in memory of the order book to reflect the increased amount, along with a market data update message being output by the exchange system to reflect the same. Conversely, a request by the user who originated the order to decrease a target quantity can result in the target quantity of the order being immediately updated in memory of the order book, along with a corresponding market data update message to be output by the exchange system to users to indicate the same, and a current tier position for the order may be maintained/unchanged within the order book.

Figure 4:
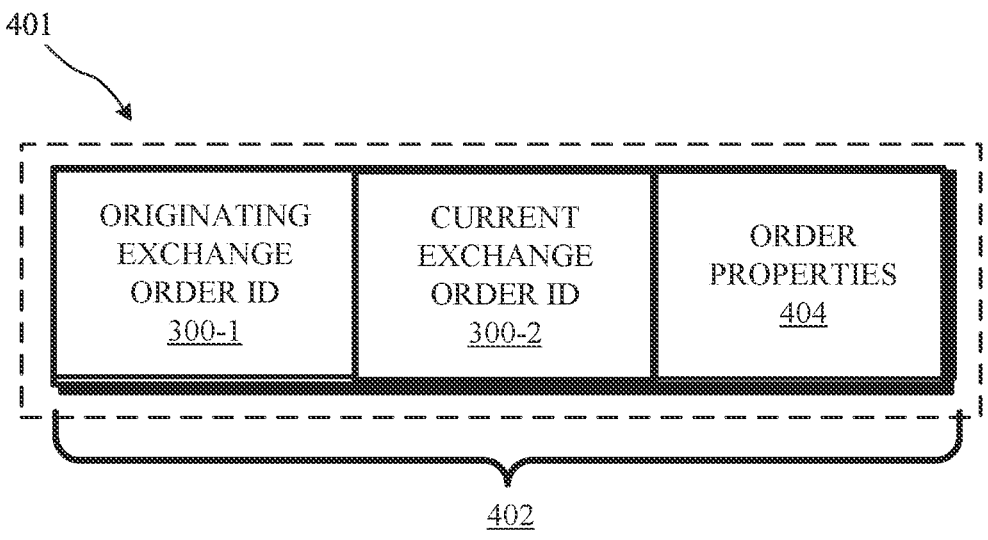
FIG. 4 shows an example representation of an order stored in an order book within a memory in accordance with aspects of the present disclosure.

For the first or initial representation of an iceberg order consistent with the present disclosure, the aforementioned rules in the memory of the ME instance can be applied by the same to generate a first exchange order identifier in a predetermined format and to determine a position to store a first/initial representation of the iceberg order within an order book. For example, as shown in FIG. 4, the representation 401 of an iceberg order can be stored in the memory region 402 of the order book in a predetermined format/ structure. This can include a fixed-length data structure for the representation 401 that includes a plurality of contiguous bytes or a logical data structure where the underlying bytes in memory may or may not be contiguous in the memory region 402. In any such cases, the representation 401 preferably includes an originating exchange order identifier 300-1, a current exchange order identifier 300-2, and order properties 404. The originating exchange order identifier 300-1 is preferably set to the first exchange order identifier generated by the ME instance in response to receiving the first request to initiate the iceberg order from the first user. The originating exchange order identifier 300-1 preferably remains constant/static during the lifespan of the iceberg order, as will be discussed further below with regard to reclip routines. The current exchange order identifier 300-2 is preferably generated and set by the ME instance each time a reclip order occurs for an iceberg order. Order properties 404 can include properties/characteristics such as a displayed quantity, a target price, a visible amount, a hidden/ reserve quantity, and a remaining iceberg quantity. The order properties 404 can further include an identifier of the originating user for the order, and/or other values such as a user-defined order identifier. The user-defined order identifier may be an alias defined by the user within the request to submit the iceberg order. The user may then submit requests to the API gateway 110 to, for example, modify the order or cancel the order by including the user-defined order identifier rather than the associated exchange order identifier generated by the ME instance.

Continuing on, the ME instance may then store the first representation of the iceberg order into the order book within memory at the determined price tier and tier position based on the implemented priority scheme, such as based on a price-time priority scheme as discussed above. Prior to, or after, storing/accepting the representation of the iceberg order into the order book within memory, the ME instance can output a trade accepted message to the first user who originated the request to submit the iceberg order. The trade accepted message can include, for example, the first exchange order identifier generated for the iceberg order. The first exchange order identifier for an iceberg order may also be referred to herein as an originating exchange order identifier.

A subsequent request received by the ME instance from a second user, e.g., from the computer device 116-2, can include a request to submit a second order that can be at least partially satisfied by the iceberg order submitted by the first user discussed above. For instance, the iceberg order may comprise a buy or sell order for a displayed quantity of a first asset type at a target price of X, and the second order may be a contra-side order for all or some of the displayed quantity of the first asset type at the target price of X. In this scenario, the ME instance may identify that the first representation of the iceberg order stored within the order book in memory can satisfy at least a portion of the second order submitted by the second user. The matching engine instance may then execute a trade based on the iceberg order from the first user. The executed trade can result in the entire displayed quantity of the iceberg order, or a portion thereof, being decremented and a market data update message being output by the exchange system to indicate the executed trade. The market data update message output by the exchange system may further indicate the new remaining quantity for the first representation of the iceberg order in the event the displayed quantity of the same remains, e.g., is non-zero, after the executed trade.

On the other hand, if the executed trade consumes/ aggresses the entire displayed quantity of the first representation of the iceberg order to satisfy the second order from the second user, the ME instance can determine that a reclip condition has occurred. Alternatively, a reclip condition can be determined when the displayed quantity of the first representation following trade execution is less than a predetermined threshold. Notably, if the second order from the second user exceeds the displayed quantity of the iceberg order, the ME instance can execute the trade utilizing the hidden/reserve portion that remains of the iceberg order. This can include the matching engine instance determining that the remaining iceberg quantity within the order properties 404 (FIG. 4) of the first representation of the iceberg order stored in the memory can be used to satisfy at least a portion of the second order from the second user. Accordingly, and in one example, the ME instance may use the remaining iceberg quantity to satisfy the second order even if the executed trade utilizes a quantity of the iceberg order that exceed the remaining displayed quantity defined by the first representation of the iceberg order. For example, consider a scenario where the iceberg order is a sell-side request and the first representation of the iceberg order has a current displayed quantity of 100 units of a first asset type at a first target price of X, and a remaining iceberg quantity of 1000 units. Further consider that the second order from the second user is a buy-side request for 500 units of the first asset type at the target price X. In this example, the ME instance may perform a matching routine that identifies the first representation of the order as satisfying at least a portion of the second order, and further, may execute a trade for the total desired amount (e.g., 500 units) by utilizing a portion of the remaining iceberg quantity rather than only the displayed quantity defined by the first representation of the first order.

In any event, and continuing on, the ME instance can execute one or more trades based on the first representation of the iceberg order in the order book, and following execution of the one or more trades, determine if a reclip condition has occurred. Determining the reclip condition can include, for instance, the ME instance determining that the first representation of the iceberg order stored in the memory has a current displayed quantity of zero and a visible amount within the order properties 404 set to a non-zero value. Of course, the ME instance can further determine that the remaining iceberg quantity within the order properties 404 of the first representation of the iceberg order has a non-zero remaining iceberg quantity following execution of the one or more trades. In response to determining the reclip condition, the ME instance may then perform a reclip operation to cause a second representation of the iceberg order to be stored in the order book. The second representation of the iceberg order is preferably similar to the first representation and can include the same target price and target quantity. The ME instance may utilize the order properties 404 of the first representation stored in the memory to ensure that the target price and quantity of the second representation of the iceberg order are set equal to those as provided/defined in the first request to submit the iceberg order from the user.

The ME instance can also generate a second exchange order identifier for the second representation of the iceberg order and set the current exchange order identifier 300-2 equal to the same. Preferably, the second exchange order identifier is generated in accordance with an encoding scheme such as discussed above with regard to the first exchange order identifier and FIGS. 3 and 4. The ME instance also preferably sets the originating exchange order identifier 300-1 for the second representation of the iceberg order to the initial/first exchange order identifier discussed above that was generated in response to receiving the request from the first user to submit the iceberg order. The order properties 404 may then be set to reflect the remaining iceberg quantity and to set a new displayed quantity/amount. For example, consider a scenario where the iceberg order was originally submitted with an overall reserve/hidden quantity of 1M, a displayed quantity of 100K, and a target price of X for a first asset, and the second order from the second user was a contra-side order for 100K of the first asset at the target price X. After execution of a trade based on the first representation of the iceberg order and determination of the reclip condition by the ME instance, the second representation stored in the order book by the ME instance may then include order properties 404 with a remaining iceberg quantity of 800K and a displayed quantity of 100K. Of course, the remaining iceberg quantity may also be set to 900K depending on a desired configuration to reflect both the 100K now made visible/displayed by the second representation of the iceberg order stored in the order book and the remaining iceberg quantity of 900K yet to be executed/ aggressed via trade(s).

The ME instance may cause the second representation of the iceberg order to be stored in the order book during the reclip based on an in-place modification of the first representation of the iceberg order in the memory. Alternatively, the ME instance can cause the second representation of the iceberg order to be stored in the order book during reclip by removing the first representation of the iceberg order from the order book and storing the second representation of the iceberg order into the order book. In any such cases, the second representation of the iceberg order can include a tier position that is identical to the tier position of the first representation of the iceberg order just prior to execution of the trade that caused the ME instance to determine a reclip condition. In one example, the tier position of the second representation of the iceberg order in the order book is guaranteed to be identical to the tier position of the first representation of the iceberg order based on the ME instance executing the reclip in an atomic transaction that includes executing the trade(s) in connection with the first representation of the iceberg order. One such example of an atomic transaction is discussed below with reference to FIG. 6. This can include the ME instance executing the trade and storing the second representation of the iceberg order in a sequence of operations/instructions that precludes any intervening modification/change to the order book. For instance, the atomic transaction of the trade and the storing of the second representation of the iceberg order in the order book can be based on a lock such as a mutex that prevents any modification to the order book in memory, e.g., the insertion of new orders into the order book, matching of orders, and execution of matched orders, until the atomic transaction is completed. In some cases, the atomic transaction can be achieved by the ME instance without a lock such as based on an ME instance being executed on a single thread that performs matching of orders, trade execution, and reclip (e.g., the storing of each representation of the iceberg order in the memory) such that the ME instance does not perform any intervening actions to the order book during the atomic transaction that would potentially modify the order book such as processing requests for new orders, updates of orders, and/or for cancelation of orders.

Continuing, the ME instance preferably outputs a trade confirmed message to the first user during the atomic transaction, such as via signals 118-2 of FIG. 1. This can include the trade confirmed message including the second exchange order identifier that was generated for the second representation of the iceberg order. The trade confirmed message may be output by the ME instance to the first user who originated the iceberg order prior to or after storing the second representation of the iceberg order in the order book. The trade confirmed message output to the first user by the ME instance can further include the originating exchange order identifier and/or the user-defined order alias, as discussed above. Preferably, the trade confirmed message is output by the matching engine instance to the user who originated the iceberg order before outputting market data updates to the market data gateway 112 in connection with the trade, examples of which is discussed below.

The ME instance can further output one or more market data updates during the atomic transaction to the market data gateway 112 (see FIG. 1). For example, the ME instance can output a first market data update to the market data gateway 112 that indicates the executed trade and properties of the same. Preferably, the first market data update output from the ME instance to the market data gateway 112 includes the current exchange order identifier that corresponds to the iceberg order associated with the executed trade and a timestamp for the executed trade. For the first representation of the iceberg order, the market data update would therefore include the originating exchange order identifier. However, when subsequent trade(s) are executed in connection with the second representation of the iceberg order, which is to say any representation of the iceberg order stored in the memory based on the matching engine instance determining the reclip condition such as a third, fourth, fifth or N representation of the iceberg order, the market data update output to the market data gateway 112 preferably does not include the originating exchange order identifier, and instead, includes the exchange order identifier which was generated by the ME instance for the corresponding representation of the iceberg order stored in the order book. For instance, consider a scenario where the first representation stored in the order book for the iceberg order has an exchange order identifier equal to ID1, and thus the originating exchange order identifier 300-1 and the current exchange order identifier 300-2 set to ID1, and the second representation stored in the order book for the iceberg order has a current exchange order identifier set to ID2 and the originating exchange order identifier set to ID1. Subsequent trade(s) that are executed by the ME instance based on the second representation of the iceberg order can then cause the ME instance to output a market data message to the market data gateway 112 that does not include the exchange order identifier of ID1 and instead the current exchange order identifier equal to ID2. Of course, the first and second market data update messages output by the matching engine instance that respectively provide the consuming users of the market data with awareness of the executed trade and the addition of the new reclip order in the order book, respectively, do not include a value that indicates the identity of the first user that initiated the iceberg trade.

The ME instance can further output a second market data update message to the market data gateway 112 during the atomic transaction for the iceberg order that indicates the storing of the second representation of the iceberg order into the order book, e.g., by indicating a new order has been accepted and stored in the order book of the ME instance, and an associated timestamp. Continuing the prior example, the second market data message output by the matching engine instance to the matching engine gateway 112 preferably does not include the originating exchange order identifier, e.g., ID1, and instead includes the current exchange order identifier, e.g., ID2. The second market data update message is preferably output by the ME instance after the first market data update message, and includes the associated timestamp being later in time relative to the timestamp of the first market data update message. The difference between the timestamp of the first market data update message and the timestamp of the second market data update message can be in a range of 5 to 50 microseconds.

Thus, the market data update messages published/output by the market data gateway 112 can include exchange order identifiers that can minimize or otherwise prevent users who consume market data from the market data gateway 112 from detecting the presence of the iceberg order. The first user who originated the iceberg order can confirm the initial/original submission and acceptance of the iceberg order through the trade confirmed message and/or through the market data update message(s) that get output by a ME and ultimately the market data gateway 112 to provide visibility to the consuming users as to the presence of a new order. The ME instance preferably performs the aforementioned reclip routine/process for the iceberg order in an automatic manner, which is to say without the necessity of the originating user performing an action to cause the reclip such as sending an API message. Instead, the ME instance continues to reclip the iceberg order and store a new or updated representation of the iceberg order in the order book until the total iceberg quantity is depleted by executed trade(s) or until the originating user requests the iceberg order to be canceled.

FIG. 5 shows one example process 500 that exemplifies aspects and features of the foregoing. The example process 500 is preferably executed by a controller, such as the controller 201 of the ME instance 204-N shown in the example of FIG. 2. The example process 500 can include more or fewer acts, and the example process 500 is not necessarily limited to the particular acts shown nor the particular sequence of acts shown in FIG. 5 unless provided below. The example process 500 may also be referred to as an iceberg order process.

In act 502, the controller receives a first order from a first user. The first order can be received by the controller via a network interface circuit. The first order preferably includes an indication that the order is an iceberg order. The indication can include, for instance, a visible amount value set to a non-zero value. The first order may also be referred to below as an iceberg order.

In act 504, the controller stores a first representation of the first order in an order book within a memory. In act 504, the controller can determine a target price tier and a tier position within the target price tier. This can include the controller determining the target price tier and tier position based on a default prioritization scheme implemented by the exchange system, such as based on a price-time priority scheme. The controller may then store the first representation in the order book within the memory based on the determined price tier and tier position. In act 504, the controller also preferably generates a first exchange order identifier for the first order and stores the same within the first representation of the first order stored in the order book within the memory.

In act 506, the controller receives a second order from a second user. In act 508, the controller can determine that the first representation of the first order satisfies at least a portion of the second order and executes a trade based on determining the first representation of the first order satisfies at least a portion of the second order.

Figure 6:
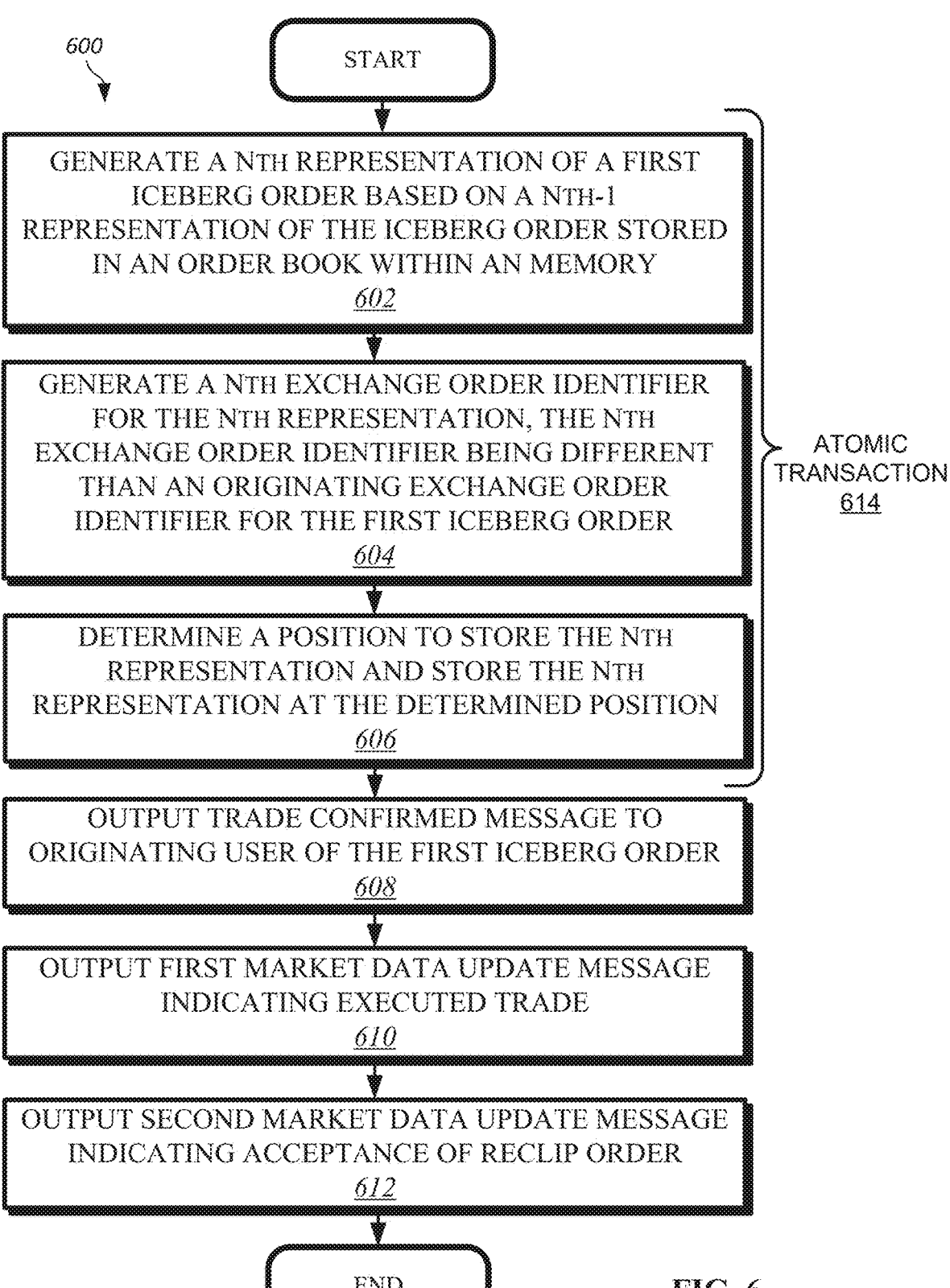
FIG. 6 shows an example atomic transaction process for an iceberg order consistent with aspects of the present disclosure.

In act 510, the controller determines a reclip condition based on the executed trade and generates a second representation of the first order. The controller can determine the reclip condition based on, for example, the first representation of the first order stored in the memory having a visible amount set to a non-zero value. FIG. 6 shows one example reclip process 600 that can be executed by the controller in act 510 and is discussed in further detail below.

In act 512, the controller stores the second representation of the first order in the order book within the memory. In act 512, the controller can store the second representation of the first order within the order book in the memory. This can include the controller storing the second representation of the first order at a location in the order book that is identical to the first representation of the first order and removing the first representation from the order book, or based on updating one or more values/characteristics within the first representation based on the trade executed in act 508 rather than generating a new representation in memory and removing the first representation from the order book. The controller can continue to repeat acts 506 to 512 until a remaining iceberg quantity for the first order is zero, or alternatively, until the first user submits a request to cancel the first order.

FIG. 6 shows an example reclip process 600 that exemplifies aspects of the foregoing. The example reclip process 600 is preferably executed by a controller, such as the controller 201 of the ME instance 204-N shown in the example of FIG. 2. The example reclip process 600 can include more or fewer acts, and the example reclip process 600 is not necessarily limited to the particular acts shown nor the particular sequence of acts shown in FIG. 6 unless provided below. As discussed above, the example reclip process 600 can be executed by the controller in act 510 of the example process 500 following an executed trade and determination of a reclip condition.

In act 602, the controller generates a NTH representation of a first iceberg order based on a NTH−1 representation of the iceberg order stored in an order book within a memory. Note, the first time a reclip condition occurs for an iceberg order following the submission of the iceberg order by a user, the NTH representation of the iceberg order will be a second representation, and the NTH−1 representation will be the first representation that gets stored in an order book initially after the request to submit the iceberg order is received. Simply put, the current representation of an iceberg order stored in the order book can be used to generate a new/reclip representation of the iceberg order for storage in the order book. In one example, values of the current representation of an iceberg order stored in the memory are updated in-place rather than generating a new representation in memory, as discussed further below. In either case, a representation of an iceberg order stored in an order book can continue to be matched by a ME instance and utilized to execute trades during operation of the exchange system 100 (see FIG. 1). Preferably, an ME instance stores only a single representation of each iceberg order within the order book at any given moment in time.

In act 604, the controller generates a NTH exchange order identifier for the NTH representation of the first iceberg order, the NTH exchange order identifier being different than an originating exchange order identifier for the first iceberg order. The originating exchange order identifier can be stored within the NTH−1 representation of the first iceberg order in the order book and retrieved therefrom by the controller in act 604.

In act 606, the controller determines a position to store the NTH representation of the first iceberg order and stores the NTH representation at the determined position within the order book in the memory. Preferably, the position of the NTH representation of the first iceberg order is identical to the position of the NTH−1 representation of the first order such that the NTH representation is in a same price tier and has a same tier position as the NTH−1 representation. In act 606, the controller can remove the NTH−1 representation of the first iceberg order from the order book within the memory before or after storing the NTH representation of the first iceberg order in the order book. Alternatively, the NTH representation of the first iceberg order may be stored in the order book by updating one or more values of the NTH−1 representation of the first iceberg order rather than by generating and storing a new representation in the order book. For example, updating of the NTH−1 representation of the first iceberg order by the controller can include setting a current exchange order identifier of the NTH−1 representation of the first iceberg order to the second exchange order identifier generated in act 510 of process 500 (See FIG. 5), and subtracting the amount of the first iceberg order utilized to satisfy the executed trade from the remaining iceberg quantity defined by the NTH−1 representation of the first iceberg order stored in the order book.

In any such cases, the NTH representation stored in the order book by the controller preferably includes an originating exchange order identifier set equal to the corresponding originating exchange order identifier defined by the NTH−1 representation of the first iceberg order, and a current exchange order identifier set equal to the second exchange order identifier generated in act 604. In addition, the NTH representation stored in the order book by the controller further can include a remaining iceberg quantity value being equal to the remaining iceberg quantity defined by the NTH−1 representation of the first iceberg order minus the amount/quantity of the first iceberg order that was utilized to satisfying the executed trade.

In act 608, the controller outputs a trade confirmed message to the user that originated the first iceberg order to indicate the executed trade. The trade confirmed message can include the second exchange order identifier that was generated in act 604. The trade confirmed message can further include the originating exchange order identifier and/or a user-defined alias for the iceberg order. Preferably, the controller outputs the trade confirmed message to the user that originated the first iceberg order prior to outputting any market data update messages to a market data gateway, such as in acts 610 and 612 discussed below, that indicate the execution of the trade in connection with the iceberg order.

In act 610, the controller outputs a first market data update message to indicate the executed trade. The first market data update message can be output by the controller to the market data gateway 112 (see FIG. 1). The first market data update message preferably includes the current exchange order identifier, which for an iceberg order is equal to the originating exchange order identifier until the first reclip occurs for the iceberg order. Following the first reclip, the current exchange order identifier for each representation of the first iceberg order stored in the order book is different than the originating exchange order identifier that gets generated for the first representation of the iceberg order. However, each of the representations of the first iceberg order stored in the order book within the memory can include the originating exchange identifier value in addition to the current exchange order identifier for the iceberg order. The controller can utilize the originating exchange identifier value for purposes of, for example, sending the trade confirmed message to the user that originated the iceberg order in act 608, as discussed above.

Trades that get executed on a reclip order, which is to say on a NTH representation of an iceberg order stored in an order book, also preferably cause the controller to output a market data update messages. However, in this scenario, this market data update message preferably does not include the originating exchange order identifier for the iceberg order and instead can include the current exchange order identifier of the iceberg order. Simply put, the originating exchange order identifier is preferably only included in a market data update messages for trade(s) executed based on the first representation of the iceberg order. After reclip and a NTH representation is stored in the memory by the controller, market data update messages can include the newly generated exchange order identifiers and not the originating exchange order identifier when trades are executed in connection with NTH representation of the iceberg order stored in the memory.

In act 612, the controller outputs a second market data update message to indicate acceptance of the reclip order (e.g., the NTH representation) in connection with the first iceberg order. The controller can output the second market data update message to the market data gateway 112 (See FIG. 1). The second market data update message preferably does not include the originating exchange order identifier for the first iceberg order. More preferably, the second market data update message does not include the originating exchange order identifier nor an identifier of the user that submitted the first iceberg order. Instead, the second market data update message can include the current exchange order identifier that was generated in act 604 and various characteristics of the NTH representation of the iceberg order, which is to say the reclip order, such as a displayed quantity available for trade, an asset type, a target price, a timestamp value associated with the acceptance of the reclip order, or any combination thereof. Preferably, the timestamp value of the second market data update message is different than the timestamp value of the first market data update message. For example, the difference between the timestamp value of the first market data update message output by the controller in act 610 relative to the timestamp value of the second market data update message output in act 612 can be in a range of 20 to 50 microseconds or at least greater than 5 microseconds. This difference can be based on a predetermined value or may be simply the natural time difference between when the first and second market data update messages get generated and output by the controller. The example reclip process 600 then ends.

Preferably, the controller performs at least acts 602 to 606 of the example reclip process 600 within a single atomic transaction 614 such that the position of the NTH representation of the first iceberg order stored in the order book has an identical tier and tier position to that of the NTH−1 representation of the iceberg order at the time of the executed trade that immediately preceded the controller determining the reclip condition. This advantageously ensures that the period of time measured from the execution of the trade in connection with the iceberg order and the acceptance/storing of the reclip order for the same in the order book is based on the latency of the controller/ME instance rather than the round-trip latency that would otherwise be introduced if a user was required to, following receipt of a trade confirmed message, manually submit the request to submit the reclip order via a network.

In some aspects, the techniques described herein relate to a system for processing of electronic trades including: a memory; a network interface circuit; at least one processor coupled to the memory and the network interface circuit and configured to: receive, via the network interface circuit, a request to submit a first order from a first user, the request to submit the first order including a target price, a hidden quantity, and a visible amount; store a first representation of the first order in an order book within the memory, the first representation of the first order including a first exchange order identifier; receive, via the network interface circuit, a request to submit a second order from a second user, the request to submit the second order including a target price and a total quantity; determine that the first representation of the first order stored in the order book within the memory satisfies at least a portion of the second order and execute a trade based on the first order; determine a reclip condition based on the executed trade and the first representation of the first order stored within the order book; and store a second representation of the first order within the order book in the memory based on determining the reclip condition, the second representation including the first exchange order identifier and a second exchange order identifier, the second exchange order identifier being different than the first exchange order identifier.

In some aspects, the techniques described herein relate to a system, wherein the at least one processor is further configured to output a trade confirmed message to the first user based on the executed trade and the determined reclip condition, the trade confirmed message including the first exchange order identifier and the second exchange order identifier.

In some aspects, the techniques described herein relate to a system, wherein the at least one processor is further configured to output via the network interface circuit a first market data update message to a market data gateway, the first market data update message including the first exchange order identifier and an indication of the executed trade.

In some aspects, the techniques described herein relate to a system, wherein the first market data update message does not include the second exchange order identifier being associated with the indication of the executed trade.

In some aspects, the techniques described herein relate to a system, wherein the at least one processor is configured to store a first timestamp value associated with the executed trade in the memory, and wherein the first market data update message output to the market data gateway includes the first timestamp value.

In some aspects, the techniques described herein relate to a system, wherein the at least one processor is configured to output a second market data message based on the reclip condition, the second market data message including the second exchange order identifier and a second timestamp value.

In some aspects, the techniques described herein relate to a system, wherein the first timestamp value included in the first market data message is different than the second timestamp value included in the second market data message.

In some aspects, the techniques described herein relate to a system, wherein a difference between the first timestamp and the second timestamp is equal to or less than 100 microseconds.

In some aspects, the techniques described herein relate to a system, wherein the at least one processor generates the first and second exchange order identifiers based on one or more rules stored in the memory.

In some aspects, the techniques described herein relate to a system, wherein the at least one processor is configured to store a pool of available exchange order identifiers in the memory, and wherein the at least one processor is further configured to generate the first and second exchange order identifiers based on the pool of available exchange order identifiers.

In some aspects, the techniques described herein relate to a system, wherein the first exchange order identifier includes a predetermined number of bits, and wherein a matching instance identifier is encoded within the predetermined number of bits.

In some aspects, the techniques described herein relate to a system, wherein a timestamp value is encoded within the predetermined number of bits.

In some aspects, the techniques described herein relate to a system, further including a clock source to output a monotonically increasing value.

In some aspects, the techniques described herein relate to a system, wherein the first exchange order identifier includes an encoded value within the predetermined number of bits based on the monotonically increasing value output by the clock source.

In some aspects, the techniques described herein relate to a system, wherein the clock source is a common clock utilized by a plurality of matching engine instances, wherein each matching engine instance is configured to store an order book in memory for an asset type, and wherein each matching engine instance of the plurality of matching engine instances generate exchange order identifiers based on the common clock source.

In some aspects, the techniques described herein relate to a system, wherein the at least one processor is configured to execute the trade and store the second representation of the first order in the order book within the memory based on the determined reclip condition in an atomic transaction such that the trade is executed and the second representation of the first order is stored in the order book at a position without an intervening update or change to the order book stored in the memory.

In some aspects, the techniques described herein relate to a system, wherein the position of the second representation in the order book is identical to a current position of the first representation of the first order in the order book prior to execution of the trade.

In some aspects, the techniques described herein relate to a system, wherein the at least one processor is configured to store the first representation of the first order within the order book with the visible amount and a first remaining iceberg quantity value set equal to the hidden quantity included in the request to submit the first order, and wherein the at least one processor determines the reclip condition based on the visible value being greater than zero.

In some aspects, the techniques described herein relate to a system, wherein the at least one processor is further configured to remove the first representation of the first order from the order book after execution of the trade.

In some aspects, the techniques described herein relate to a system, wherein the at least one processor is further configured to store the second representation of the first order in the order book by updating one or more values of the first representation of the first order stored in the order book.

In some aspects, the techniques described herein relate to a computer-implemented method for processing of electronic trades including: receiving, by at least one processor via a network interface circuit, a request to submit a first order from a first user, the request to submit the first order including a target price, a hidden quantity, and a visible amount; storing, by the at least one processor, a first representation of the first order in an order book within a memory, the first representation of the first order including a first exchange order identifier; receiving, by the at least one processor via the network interface circuit, a request to submit a second order from a second user, the request to submit the second order including a target price and a total quantity; determining, by the at least one processor that the first representation of the first order stored in the order book within the memory satisfies at least a portion of the second order and execute a trade based on the first order; determining, by the at least one processor, a reclip condition based on the executed trade and the first representation of the first order stored within the order book; and storing, by the at least one processor, a second representation of the first order within the order book in the memory based on determining the reclip condition, the second representation including the first exchange order identifier and a second exchange order identifier, the second exchange order identifier being different than the first exchange order identifier.

In some aspects, the techniques described herein relate to a computer-implemented method, further including outputting, by the at least one processor, a trade confirmed message to the first user based on the executed trade and the determined reclip condition, the trade confirmed message including the first exchange order identifier and the second exchange order identifier.

In some aspects, the techniques described herein relate to a computer-implemented method, further including outputting, by the at least one processor, via the network interface circuit a first market data update message to a market data gateway, the first market data update message including the first exchange order identifier and an indication of the executed trade.

In some aspects, the techniques described herein relate to a computer-implemented method, wherein the first market data update message does not include the second exchange order identifier being associated with the indication of the executed trade.

In some aspects, the techniques described herein relate to a computer-implemented method, further including storing, by the at least one processor, a first timestamp value associated with the executed trade in the memory, and wherein the first market data update message output to the market data gateway includes the first timestamp value.

In some aspects, the techniques described herein relate to a computer-implemented method, further including outputting, by the at least one processor, a second market data message based on the reclip condition, the second market data message including the second exchange order identifier and a second timestamp value.

In some aspects, the techniques described herein relate to a computer-implemented method, wherein the first timestamp value included in the first market data message is different than the second timestamp value included in the second market data message.

In some aspects, the techniques described herein relate to 22. The computer-implemented method, wherein a difference between the first timestamp and the second timestamp is equal to or less than 100 microseconds.

In some aspects, the techniques described herein relate to a computer-implemented method, further including generating, by the at least one processor, the first and second exchange order identifiers based on one or more rules stored in the memory.

In some aspects, the techniques described herein relate to a computer-implemented method, further including storing, by the at least one processor, a pool of available exchange order identifiers in the memory, and generating, by the at least one processor, the first and second exchange order identifiers based on the pool of available exchange order identifiers.

In some aspects, the techniques described herein relate to a computer-implemented method, wherein the first exchange order identifier includes a predetermined number of bits, and wherein a matching instance identifier is encoded within the predetermined number of bits.

In some aspects, the techniques described herein relate to a computer-implemented method, further including encoding, by the at least one processor, a timestamp value within the predetermined number of bits.

In some aspects, the techniques described herein relate to a computer-implemented method, further including encoding, by the at least one processor, a value within the predetermined number of bits based on a monotonically increasing value.

In some aspects, the techniques described herein relate to a computer-implemented method, further including executing, by the at least one processor, the trade and storing the second representation of the first order in the order book within the memory based on the determined reclip condition in an atomic transaction such that the trade is executed and the second representation of the first order is stored in the order book at a position without an intervening update or change to the order book stored in the memory.

In some aspects, the techniques described herein relate to a computer-implemented method, wherein the position of the second representation in the order book is identical to a current position of the first representation of the first order in the order book prior to execution of the trade.

In some aspects, the techniques described herein relate to a computer-implemented method, further including storing, by the at least one processor, the first representation of the first order within the order book with the visible amount and a first remaining iceberg quantity value set equal to the hidden quantity included in the request to submit the first order, and wherein determining the reclip condition is based on the visible value being greater than zero.

In some aspects, the techniques described herein relate to a computer-implemented method, further including removing, by the at least one processor, the first representation of the first order from the order book after execution of the trade.

In some aspects, the techniques described herein relate to a computer-implemented method, further including storing, by the at least one processor, the second representation of the first order in the order book based on updating one or more values of the first representation of the first order stored in the order book.

In some aspects, the techniques described herein relate to a non-transitory computer-readable medium having a plurality of instructions stored thereon that when executed by at least one processor cause a process to be performed, the process including: receiving, via a network interface circuit, a request to submit a first order from a first user, the request to submit the first order including a target price, a hidden quantity, and a visible amount; storing a first representation of the first order in an order book within a memory, the first representation of the first order including a first exchange order identifier; receiving a request to submit a second order from a second user, the request to submit the second order including a target price and a total quantity; determining that the first representation of the first order stored in the order book within the memory satisfies at least a portion of the second order and execute a trade based on the first order; determining a reclip condition based on the executed trade and the first representation of the first order stored within the order book; and storing a second representation of the first order within the order book in the memory based on determining the reclip condition, the second representation including the first exchange order identifier and a second exchange order identifier, the second exchange order identifier being different than the first exchange order identifier.

In some aspects, the techniques described herein relate to a non-transitory computer-readable medium, wherein the process further includes outputting, by the at least one processor, a trade confirmed message to the first user based on the executed trade and the determined reclip condition, the trade confirmed message including the first exchange order identifier and the second exchange order identifier.

In some aspects, the techniques described herein relate to a non-transitory computer-readable medium, wherein the process further includes outputting via the network interface circuit a first market data update message to a market data gateway, the first market data update message including the first exchange order identifier and an indication of the executed trade.

In some aspects, the techniques described herein relate to a non-transitory computer-readable medium, wherein the first market data update message does not include the second exchange order identifier being associated with the indication of the executed trade.

In some aspects, the techniques described herein relate to a non-transitory computer-readable medium, wherein the process further includes storing a first timestamp value associated with the executed trade in the memory, and wherein the first market data update message output to the market data gateway includes the first timestamp value.

In some aspects, the techniques described herein relate to a non-transitory computer-readable medium, wherein the process further includes outputting a second market data message based on the reclip condition, the second market data message including the second exchange order identifier and a second timestamp value.

In some aspects, the techniques described herein relate to a non-transitory computer-readable medium, wherein the first timestamp value included in the first market data message is different than the second timestamp value included in the second market data message.

In some aspects, the techniques described herein relate to a non-transitory computer-readable medium, wherein a difference between the first timestamp and the second timestamp is equal to or less than 100 microseconds.

In some aspects, the techniques described herein relate to a non-transitory computer-readable medium, wherein the process further includes generating the first and second exchange order identifiers based on one or more rules stored in the memory.

In some aspects, the techniques described herein relate to a non-transitory computer-readable medium, wherein the process further includes storing a pool of available exchange order identifiers in the memory, and generating the first and second exchange order identifiers based on the pool of available exchange order identifiers.

In some aspects, the techniques described herein relate to a non-transitory computer-readable medium, wherein the first exchange order identifier includes a predetermined number of bits, and wherein a matching instance identifier is encoded within the predetermined number of bits.

In some aspects, the techniques described herein relate to a non-transitory computer-readable medium, wherein the process further includes encoding a timestamp value within the predetermined number of bits.

In some aspects, the techniques described herein relate to a non-transitory computer-readable medium, wherein the process further includes encoding a value within the predetermined number of bits based on a monotonically increasing value.

In some aspects, the techniques described herein relate to a non-transitory computer-readable medium, wherein the process further includes executing the trade and storing the second representation of the first order in the order book within the memory based on the determined reclip condition in an atomic transaction such that the trade is executed and the second representation of the first order is stored in the order book at a position without an intervening update or change to the order book stored in the memory.

In some aspects, the techniques described herein relate to a non-transitory computer-readable medium, wherein the position of the second representation in the order book is identical to a current position of the first representation of the first order in the order book prior to execution of the trade.

In some aspects, the techniques described herein relate to a non-transitory computer-readable medium, wherein the process further includes further including storing, by the at least one processor, the first representation of the first order within the order book with the visible amount and a first remaining iceberg quantity value set equal to the hidden quantity included in the request to submit the first order, and wherein determining the reclip condition is based on the visible value being greater than zero.

In some aspects, the techniques described herein relate to a non-transitory computer-readable medium, wherein the process further includes removing the first representation of the first order from the order book after execution of the trade.

In some aspects, the techniques described herein relate to a non-transitory computer-readable medium, wherein the process further includes storing the second representation of the first order in the order book based on updating one or more values of the first representation of the first order stored in the order book.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a device, system, or method consistent with the present disclosure may embody any one or more of the features contained herein and that the features may be used in any particular combination or sub-combination. Modifications and substitutions by one of ordinary skill in the art are considered to be within the scope of the present disclosure, which is not to be limited except by the claims.

The invention claimed is:

1. A system for processing of electronic trades comprising:

a memory;

a network interface circuit;

at least one processor coupled to the memory and the network interface circuit and configured to:

receive, via the network interface circuit, a request to submit a first order from a first user for an asset, the first order being an iceberg order and the request to submit the first order including a first target price, a hidden quantity of the iceberg order, and a visible amount of the iceberg order;

store a first representation of the first order in an order book within the memory, the first representation of the first order including a first exchange order identifier that is unique to the first order stored in the order book within the memory;

receive, via the network interface circuit, a request to submit a second order from a second user for the asset, the request to submit the second order including a second target price and a second order quantity;

determine that the first representation of the first order stored in the order book within the memory satisfies at least a portion of the second order based on the second target price of the second order being equal to the first target price of the first order and execute a trade based on the first order;

determine a reclip condition for the first order based on the executed trade and the first representation of the first order stored within the order book, wherein the reclip condition is determined based on the visible amount of the iceberg order of the first order being zero following the executed trade and the hidden quantity being greater than zero; and store a second representation of the first order within the order book in the memory during an atomic transaction based on determining the reclip condition, the second representation including the first exchange order identifier and a second exchange order identifier, the second exchange order identifier being different than the first exchange order identifier and unique to the first order stored within the order book.

2. The system of claim 1, wherein the at least one processor is further configured to output a trade confirmed message to the first user based on the executed trade and the determined reclip condition, the trade confirmed message including the first exchange order identifier and the second exchange order identifier.

3. The system of claim 1, wherein the at least one processor is further configured to output via the network interface circuit a first market data update message to a market data gateway, the first market data update message including the first exchange order identifier and an indication of the executed trade.

4. The system of claim 1, wherein the at least one processor is further configured to generate the first and second exchange order identifiers based on one or more rules stored in the memory.

5. The system of claim 1, wherein the first exchange order identifier includes a predetermined number of bits, and wherein a matching instance identifier is encoded within the predetermined number of bits.

6. The system of claim 5, further comprising a clock source to output a monotonically increasing value, and wherein the first exchange order identifier further includes an encoded value within the predetermined number of bits based on the monotonically increasing value output by the clock source.

7. The system of claim 1, wherein the at least one processor is further configured to store the first representation of the first order within the order book with the visible amount and a first remaining iceberg quantity value set equal to the hidden quantity included in the request to submit the first order.

8. The system of claim 1, wherein the at least one processor is further configured to remove the first representation of the first order from the order book after execution of the trade.

9. The system of claim 1, wherein the at least one processor is further configured to store the second representation of the first order in the order book by updating one or more values of the first representation of the first order stored in the order book.

10. A computer-implemented method for processing of electronic trades comprising:

receiving, by at least one processor via a network interface circuit, a request to submit a first order from a first user for an asset, the first order being an iceberg order and the request to submit the first order including a first target price, a hidden quantity of the iceberg order, and a visible amount of the iceberg order;

storing, by the at least one processor, a first representation of the first order in an order book within a memory, the first representation of the first order including a first exchange order identifier that is unique to the first order stored in the order book within the memory;

receiving, by the at least one processor via the network interface circuit, a request to submit a second order from a second user for the asset, the request to submit the second order including a second target price and a second order quantity;

determining, by the at least one processor that the first representation of the first order stored in the order book within the memory satisfies at least a portion of the second order based on the second target price of the second order being equal to the first target price of the first order and execute a trade based on the first order;

determining, by the at least one processor, a reclip condition for the iceberg order of the first order based on the executed trade and the first representation of the first order stored within the order book, wherein the reclip condition is determined based on the visible amount of the iceberg order of the first order being zero following the executed trade and the hidden quantity being greater than zero; and storing, by the at least one processor, a second representation of the first order within the order book in the memory during an atomic transaction based on determining the reclip condition, the second representation including the first exchange order identifier and a second exchange order identifier, the second exchange order identifier being different than the first exchange order identifier and unique to the first order stored within the order book.

11. The computer-implemented method of claim 10, further comprising outputting, by the at least one processor, a trade confirmed message to the first user based on the executed trade and the determined reclip condition, the trade confirmed message including the first exchange order identifier and the second exchange order identifier.

12. The computer-implemented method of claim 10, further comprising generating, by the at least one processor, the first and second exchange order identifiers based on one or more rules stored in the memory.

13. The computer-implemented method of claim 10, wherein the first exchange order identifier includes a predetermined number of bits, and wherein a matching instance identifier is encoded within the predetermined number of bits.

14. The computer-implemented method of claim 13, further comprising encoding, by the at least one processor, a value within the predetermined number of bits based on a monotonically increasing value.

15. A non-transitory computer-readable medium having a plurality of instructions stored thereon that when executed by at least one processor cause a process to be performed, the process comprising:

receiving, via a network interface circuit, a request to submit a first order from a first user for an asset, the first order being an iceberg order and the request to submit the first order including a first target price, a hidden quantity of the iceberg order, and a visible amount for the iceberg order;

storing a first representation of the first order in an order book within a memory, the first representation of the first order including a first exchange order identifier that is unique to the first order stored in the order book within the memory;

receiving a request to submit a second order from a second user for the asset, the request to submit the second order including a second target price and a second order quantity;

determining that the first representation of the first order stored in the order book within the memory satisfies at least a portion of the second order and execute a trade based on the first order;

determining a reclip condition for the iceberg order of the first order based on the executed trade and the first representation of the first order stored within the order book, wherein the reclip condition is determined based on the visible amount of the iceberg order of the first order being zero following the executed trade and the hidden quantity being greater than zero; and storing a second representation of the first order within the order book in the memory during an atomic transaction based on determining the reclip condition, the second representation including the first exchange order identifier and a second exchange order identifier, the second exchange order identifier being different than the first exchange order identifier and unique to the first order stored within the order book.

16. The non-transitory computer-readable medium of claim 15, wherein the process further comprises storing, by the at least one processor, the first representation of the first order within the order book with the visible amount and a first remaining iceberg quantity value set equal to the hidden quantity included in the request to submit the first order.

* * * * *